Jan. 7, 1947.  C. L. THOMAS ET AL  2,414,002
REGENERATION OF SUBDIVIDED SOLID CONTACT MATERIAL
Filed Feb. 28, 1944
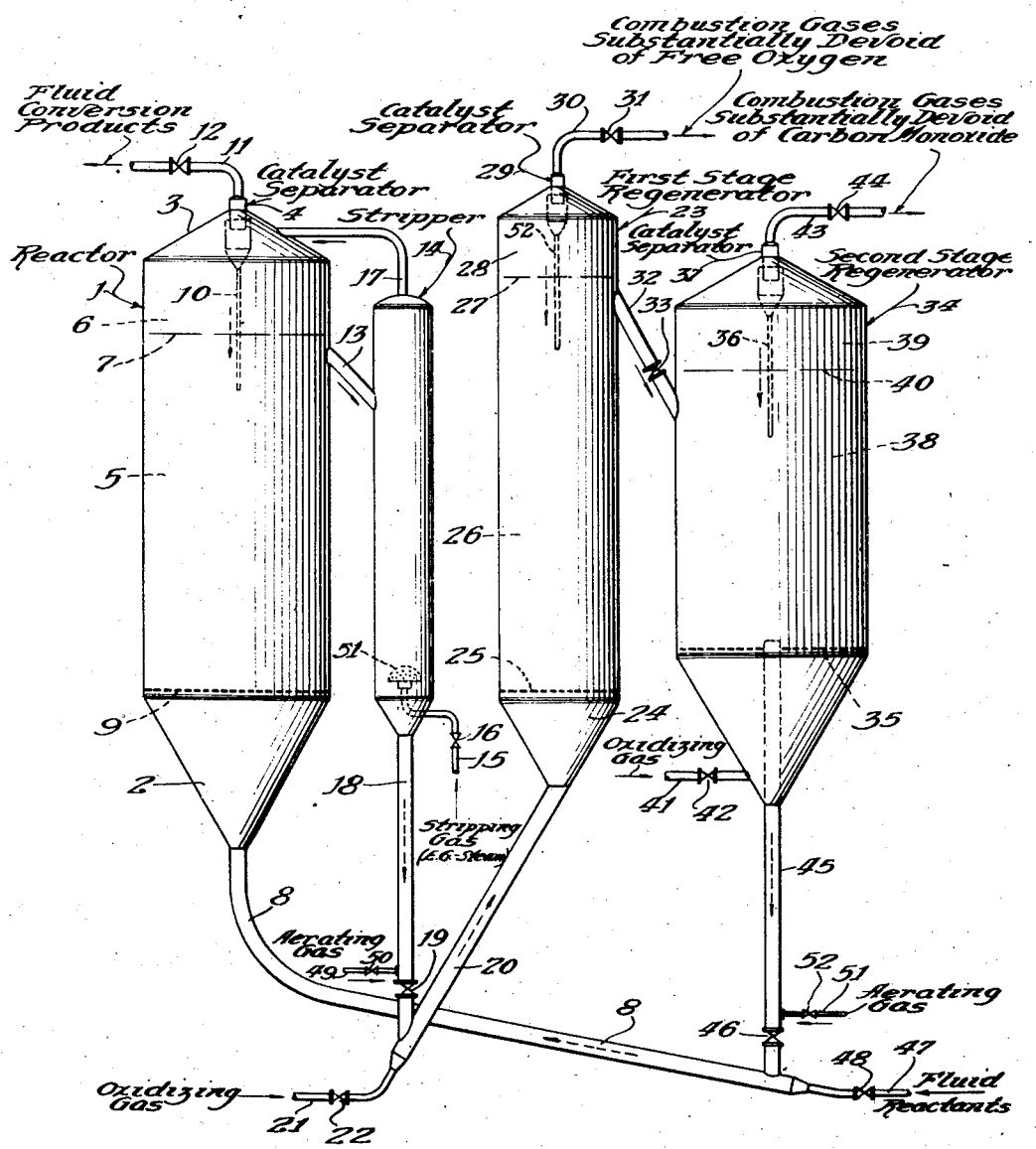
Inventors:
Charles L. Thomas
John T. Pinkston, Jr.
By: Lee J. Gary
Attorney Patented Jan. 7, 1947

2,414,002

UNITED STATES PATENT OFFICE 2,414,002

REGENERATION OF SUBDIVIDED SOLID CONTACT MATERIAL

Charles L. Thomas and John T. Pinkston, Jr., Riverside, Ill., assignors to Universal Oil Products Company, Chicago, Ill., a corporation of Delaware Application February 28, 1944, Serial No. 524,246

7 Claims. (Cl. 196—52)

The invention is directed to in improved process and apparatus for the conversion of fluid reactants in the presence of a mass of subdivided solid contact material or catalyst which accumulates deleterious combustible products of the reaction and is regenerated by burning combustibles therefrom. The invention is particularly directed to improvements in the regenerating step of the process but also involves the overall operation including the regeneration and the step in which the combustibles are accumulated by the solid contact material.

The improvements in the regenerating step are advantageously applicable to any operation of the general type herein specified in which deleterious combustibles are burned from a mass of subdivided solid material while said mass is maintained in the form of a relatively dense fluid-like bed. Therefore, the invention is not limited to conducting any specific conversion reaction in the reaction step of the process, as distinguished from the regenerating step, so long as it results in the accumulation of deleterious combustibles by the subdivided solid particles of catalyst or contact material employed, so that the latter require regeneration to remove said combustible contaminants by burning. The invention therefore embraces a wide range of processes for the conversion and for treatment of fluid hydrocarbons and other fluid reactants in which the subdivided solid contact material is relatively inert or in which it acts as a catalyst for promoting the reaction, or in which it comprises a reagent. The hydrocarbon conversion reactions of catalytic cracking, reforming, dehydrogenation, aromatization, or dehydrocyclization and various combinations of such reactions are specifically contemplated by the invention. A process of catalytically cracking normally liquid hydrocarbons boiling above the range of gasoline for the purpose of producing substantial yields of good antiknock gasoline will serve to illustrate the features and advantages of the invention and the following description will be directed primarily to such an operation.

A type of catalytic cracking process which has recently come into commercial prominence and is being widely used is known as the "fluid bed" type. As distinguished from the "fixed bed" type of operation, the fluid bed process employs separate reaction and regenerating zones between and through which the cracking catalyst is continuously circulated so that the reaction step and the regenerating step are conducted continuously without alternate use of the same reaction vessel in processing and regeneration service. This is a pronounced advantage in that it obviates the use of switch valves, time cycle controllers and the like and avoids exposing the reaction vessels to alternate oxidizing and reducing conditions. It has the further pronounced advantage of providing a means for transferring heat for conducting the cracking reaction from the exothermic regenerating step to the reacting step in the circulating stream of catalyst transferred from the regenerator to the reactor. Also the circulating stream of relatively cool catalyst particles transferred from the reactor to the regenerator assists in preventing the development of an excessively high temperature in the latter zone.

As distinguished from operations of the "compact moving bed" type, the "fluid bed" type of operation maintains the bed of catalyst undergoing regeneration in the regenerating vessel and the bed of catalyst employed to promote the reaction in the reaction vessel in a fluid-like state of relatively high solid particle concentration with sufficient turbulence or local circulation of catalyst particles within the bed to effect a substantially uniform distribution of heat therein. This materially simplifies the problem of maintaining a substantially uniform temperature in the reaction zone and prevents the development of localized excessively high temperatures in the catalyst bed undergoing regeneration.

In the regenerating step of the fluid bed type of process above mentioned, and to which the invention is addressed, the bed of subdivided catalyst or contact material undergoing regeneration is maintained in the desired relatively dense and turbulent fluid-like state by passing oxidizing gas employed for accomplishing its regeneration upwardly into the bed at a velocity which partially counteracts the force of gravity on the solid particles and brings about their hindered settling. In such operations it is decidedly advantageous, for effecting the separation of resulting combustion gases from solid particles of the bed, to maintain the upper extremity of the relatively dense fluid-like bed at a sufficient distance beneath the combustion gas outlet from the regenerator to provide a light phase region of material extending above the fluid bed. With provision for maintaining a dense phase level at the desired elevation within the vessel a major separation of solid particles from the outgoing combustion gases is effected within said light phase and, more particularly, at the approximate upper extremity of the fluid-like bed, so that the load on the succeeding separating equipment is materially reduced and the loss of catalysts in the outgoing gas stream is minimized.

With a light phase region such as above mentioned disposed above the fluid bed in the regenerator the concentration of solid particles in this region is not sufficient to effect the rapid dispersion of heat in the light phase and we have found that, under ordinary operating conditions, this gives rise to a phenomenon known as "afterburning" in the light phase which is extremely detrimental to the activity and useful life of the catalyst.

We have found that after-burning occurs in the light phase of the regenerator when the proportional amounts of free oxygen and combustibles in the gas mixture existing in this zone is such that the mixture is inflammable and will be readily ignited. Ignition may occur by contact of the mixture in the light phase with hot metal surfaces of the regenerating vessel, catalyst separating equipment or the like in the light phase region. In studying this phenomenon of after-burning in a small regenerator equipped with glass observation ports, we have found that a small flame will first occur at some point in the light phase region of the regenerator and rapidly spread until it often progresses through all or a substantial portion of the light phase region. This is accompanied by a pronounced glowing of the solid particles in the region of the flame, indicating that they have been excessively heated.

We attribute the rapid decline in catalyst activity, which is sometimes experienced in catalytic cracking operations of the fluid bed type, to the occurrence of after-burning in the light phase of the regenerator. Even through a low catalyst particle concentration exists in the light phase, the rates of catalyst circulation are rather high and a quantity of catalyst corresponding to the entire catalyst inventory of the system will have been present in the light phase during a rather short period of operation. Since heating of even the best cracking catalyst now employed in commercial operation to a temperature above 1300° F. to 1400° F., or thereabouts will rapidly impair its catalytic activity, it will be seen that the occurrence of after-burning will rapidly and permanently degrade the activity of the entire catalyst inventory of the plant.

The present invention seeks to provide a method of regenerating subdivided solid catalyst or contact material in a system of the fluid bed type which will preclude or prevent the occurrence of after-burning and thus obviate the consequent overheating and rapid degradation of the catalyst activity. This objective is achieved by a method which involves regeneration of the catalyst or contact material to the desired degree of completion in two successive stages which are conducted in separate regenerating zones, as will now be explained.

In one specific embodiment of the invention a stream of contaminated subdivided solid catalyst or contact material withdrawn from the fluid bed in the reaction step of the process is preferably first purged of occluded and adsorbed volatile combustibles, such as hydrocarbon vapors and gases, to reduce the amount of combustibles which must be burned in the regenerating step of the process and also to make possible the recovery of these valuable volatiles. The substantially stripped particles are then supplied to a vessel in which the first step of their regenerating treatment is accomplished while maintaining a relatively dense fluid-like bed of the solid particles undergoing regeneration in the lower portion of the vessel and a light phase of materially reduced solid particle concentration in its upper portion. Air or other oxidizing gas is supplied to the lower portion of this first stage regenerator in an amount sufficient to maintain the bed in the desired relatively dense fluid-like state and burn a portion of the contaminating combusibles from the solid particles. An essential feature of this first stage regeneration resides in limiting the quantity of free oxygen supplied to the bed in the incoming regenerating gas stream so that substantially all of its free oxygen content is consumed in passing through the bed, whereby the free oxygen concentration in the light phase is kept at a sufficiently low value that the gas mixture in this zone is not flammable under the operating conditions of temperature and pressure maintained therein.

The size of the first stage regenerating vessel or, more particularly, the size of the relatively dense fluid bed maintained therein is such that the desired average residence time is afforded the solid particles therein at the desired rate at which the solid particles are circulated through the system. The volume of the bed is thus determined to suit the residence time requirement and, preferably, the vessel is constructed to permit a sufficient variation in the dense phase level maintained therein to accommodate any changes which may be required or desirable in the circulation rate. The cross-sectional area of the vessel is also so proportioned in relation to its height that linear velocity of the gases passing therethrough imparts to the bed the desired degree of fluidization while keeping the rate at which regenerating gas of predetermined free oxygen concentration is supplied to the bed at a value which precludes the substantial passage of free oxygen through the bed.

Both the average residence time for the solid particles in the first stage regenerator and the rate at which oxidizing gas is supplied to this zone are preferably lower than the residence times and oxidizing gas rates now commonly employed in the single regenerator of the fluid bed type system. This limits the degree of regeneration afforded the solid particles in the first stage regenerator to a value less than that commonly obtained in a single regenerator. It also results in a somewhat selective burning of the relatively light combustible contaminants, leaving a substantial portion of the heavier combustible contaminants on the solid particles to be burned in the succeeding or second stage regenerator.

A stream of partially regenerated solid particles is directed from the fluid bed in the first stage regenerator into a similar fluid-like bed maintained in the succeeding or second stage regenerating vessel. As in the first stage regenerator, a light phase of materially reduced solid particle concentration is maintained above the relatively dense fluid bed in the second stage regenerator. Oxidizing gas is passed upwardly into the bed to keep it in the desired relatively dense fluid-like condition and burn a substantial portion of the remaining combustible contaminants from the solid particles. The quantity of regenerating gas thus employed in the second stage regenerator is kept sufficiently high that only a portion of its free oxygen content is consumed in passing through the bed. In the presence of the excess oxygen, the combustible contaminants on the solid particles are substantially completely oxidized so that little or no carbon monoxide or other combustibles will be present in the gas mixture leaving the second stage fluid bed. The resulting absence or low concentration of carbon monoxide and other combustibles in the second stage light phase renders the gas mixture therein non-flammable so that after-burning will not occur in this region.

A stream of the hot regenerated subdivided solid catalyst or contact material is withdrawn from the fluid bed in the second stage regenerator and returned to the fluid bed in the reaction zone to complete the circuit through the system, maintain the activity of the bed in the reactor and supply to the reaction zone and to the reactants undergoing conversion therein at least a substantial portion of the required endothermic heat of reaction.

The second stage regenerating vessel is of such size and proportions that it provides the required residence time for the solid particles therein to complete their reactivation to the desired degree and permit the use of a sufficient quantity of regenerating gas in this zone to provide the desired excess of free oxygen, while employing a linear gas velocity through the bed which will give the desired degree of fluidity and hindered settling for the solid particles within the bed.

It is worthy of note that the two-stage method of regeneration provided by the invention, employing a deficiency of oxygen in the first stage and an excess of oxygen in the second stage, has important and pronounced advantages in addition to the elimination of after-burning. It is possible to operate a fluid bed process of the general type herein provided with a single regenerating zone in such a manner that after-burning is prevented in the light phase of the regenerator. To accomplish this the single regenerator could be operated either in a manner similar to that employed for operation of the first stage regenerator of the present process (i. e., with a deficiency of free oxygen in the regenerating gas stream) or in a manner similar to that employed for operating the second stage regenerator of the present system (i. e., with an excess of free oxygen in the regenerating gas stream). However, regeneration in a single stage, operating with a deficiency of oxygen, cannot achieve as complete and thorough regeneration as the two-stage method herein provided, except at a dangerously high temperature. On the other hand, single stage regeneration employing a sufficient excess of air to preclude after-burning will not accomplish regeneration to the same degree of completeness as the two-stage method herein provided, except when an exceptionally large quantity of regenerating gas is employed as compared with that necessary for the two-stage regeneration herein provided.

A high order of activity for the regenerated catalyst results from its more complete regeneration or more complete removal of combustibles therefrom, accomplished by the present process, and the resulting higher activity level of the catalyst supplied to the reaction step is a pronounced advantage. For a given percent conversion of the fluid reactants the liquid hourly space velocity (expressed as pounds of reactants passed through the reaction zone per hour, per pound of catalyst present in the reaction) zone may be increased with increasing catalyst activity. Thus, at an increased activity level, the size of the reaction zone for a given capacity and percent conversion may be reduced, or the hourly throughput of reactants may be increased for a given percent conversion in a reactor of given size, or the percent conversion can be increased at a given throughput in a reactor of given size. In many instances an increased catalyst activity will also increase its selectivity with respect to the desired reaction and thus increase the quality or yield of the desired product at a given percent total conversion of the charging stock by reducing undesirable secondary or side reactions.

The accompanying diagrammatic drawing is an elevational view of one specific form of apparatus in which the improved process provided by the invention may be successfully accomplished.

Referring to the drawing, the reactor 1 is a vertically elongated, substantially cylindrical vessel having a substantially conical lower head 2 and an upper head 3 in which suitable equipment, such as a cyclone separator, indicated at 4, is mounted.

A relatively dense fluid-like bed 5 of sub-divided solid catalyst or contact material is maintained within the reactor and a light phase 6 of materially reduced solid particle concentration is maintained within the upper portion of the reaction vessel above the fluid bed. The approximate upper extremity of the relatively dense fluid-like bed is indicated by the broken line 7.

Fluid reactants to be converted, such as, for example, hydrocarbon oil or hydrocarbon vapors or gases are supplied through line 47 and valve 48 to transfer line 8 wherein they commingle, as will be later described, with a stream of hot regenerated catalyst or contact material withdrawn from the second stage regenerator. In case the reactants are supplied to line 8 in liquid state, all or a substantial portion of the reactants will be quickly vaporized by contact with the stream of hot solid particles from the regenerator with which they are commingled. The gas-lift action of the vaporous or gaseous reactants transports the regenerated solid particles through line 8 into the lower portion of the reactor 1 and upwardly through the bed 5 in this zone, wherein the conversion reaction takes place. The incoming fluid reactants and regenerated solid particles are substantially uniformly distributed over the cross-sectional area of the cylindrical portion of reactor 1 and the fluid bed 5 by means of a perforate plate or other suitable form of distributing grid indicated at 9.

The fluid conversion products resulting from the conversion reaction conducted in reactor 1 pass from the fluid bed 5 into the light phase 6 and a major separation of solid particles from the fluid conversion products is effected within the relatively dense fluid-like bed or, more particularly, adjacent the upper extremity thereof in the region which separates the bed from the light phase. The fluid conversion products and remaining relatively small quantity of solid particles suspended therein are directed to the separator 4 wherein all or a substantial portion of the remaining solid particles are removed from the outgoing stream of fluid conversion products. The thus separated solid particles are returned from the lower portion of separator 4 through standpipe 10 to the fluid bed 5. The fluid conversion products are discharged from the upper portion of separator 4 through line 11 and the pressure control valve 12 preferably to further separating, fractionating and recovery equipment which does not constitute a novel part of the present invention and is therefore not illustrated.

The upward velocity of the fluid reactants and resulting fluid conversion products passing through bed 5 is kept at a value that the ascending vapors or gases partially counteract the force of gravity on the solid particles of the bed and keep the latter in a turbulent fluid-like state of relatively high solid particle concentration. For example, with a typical cracking catalyst of the silica-alumina type, the catalyst concentration in the fluid bed may be 20 to 30 pounds, or thereabouts, per cubic foot, while the catalyst concentration in the light phase 6 may, for example, be within the range of 0.2 to 5 pounds per cubic foot.

A stream of solid particles is withdrawn from a suitable point in bed 5 beneath its upper extremity 7, and preferably, from a relatively high point in the bed, and is directed through conduit 13 into a separate stripping zone comprising the column or vessel 14, wherethrough a fluid-like mass of the solid particles is directed downwardly countercurrent to and in direct contact with steam or other suitable stripping fluid supplied to the lower portion of the stripper through line 15, valve 16 and a suitable distributing member indicated at 51. The stripping gas serves to keep the descending mass of catalyst particles in a fluid-like condition, preferably of lower catalyst particle concentration than that prevailing in bed 5 and also serves to replace and strip-out volatile reactants and/or conversion products occluded in the stream of solid particles supplied to the stripping zone through conduit 13, as well as a substantial portion of the volatile reactants and conversion products adsorbed by the solid particles. The resulting mixture of stripped-out volatiles and stripping fluid is directed from the upper portion of stripper 14 through line 17 back into the light phase 6 in the reactor or, when desired, line 17 may communicate directly with the separator 4.

A relatively dense column of substantially stripped solid particles is directed from the lower portion of stripper 14 through standpipe 18 and an adjustable orifice or flow control valve 19 disposed adjacent the lower end of standpipe 18 into transfer line 20. Here the solid particles meet and commingle with a stream of oxidizing gas supplied to line 20 through line 21 and valve 22. Steam or other suitable relatively inert gas is supplied through line 49 and valve 50 to standpipe 18 on the upstream side of valve 19 to serve as an aerating fluid which prevents excessive compaction of the column of solid particles passing through standpipe 18 so as to insure continuous flow of the solid particles therethrough.

The oxidizing gas supplied to line 20, as previously described, serves by its gas-lift action to transport the solid particles from stripper 14 through line 20 into the lower portion of the first stage regenerator 23. It serves in regenerator 23 as an oxidizing medium for burning a substantial portion of the remaining combustible contaminants from the solid particles and as a means of keeping the bed of the solid particles maintained within regenerator 23 in a fluid-like state of relatively high solid particle concentration.

The fluid-like bed of solid particles undergoing regeneration in regenerator 23 is designated by the reference numeral 26 and the incoming oxidizing gas and solid particles to be regenerated are distributed substantially uniformly over the cross-sectional area of the cylindrical portion of regenerator 23 and bed 26 by a perforate plate or other suitable form of distributing grid indicated at 25. The approximate upper extremity of fluid bed 26 is indicated by the broken line 27 and a light phase 28 of materially reduced solid particle concentration is maintained in the upper portion of regenerator 23 above the fluid bed 26.

Air or other oxidizing gas of predetermined free oxygen content, such as, for example, air diluted with carbon dioxide or substantially oxygen-free combustion gases, is preferably employed as the regenerating gas in regenerator 23. It is supplied to this regenerator at a sufficiently low rate that its free oxygen content is substantially entirely consumed in burning combustibles from the solid particles as it passes through bed 26. Thus, the spent regenerating gas and combustion products entering the light phase 28 from the fluid bed in the first stage regenerator is kept substantially devoid of free oxygen or at least so low in free oxygen content that it is non-flammable under the operating conditions of temperature and pressure prevailing in the light phase. After-burning is thereby prevented in light phase 28 of the first stage regenerator.

The gas mixture substantially devoid of free oxygen is directed from the light phase 28 in regenerator 23 with a relatively small amount of entrained solid particles into separator 29 wherein at least a substantial portion of the remaining entrained solid particles are centrifugally separated from the gases. The thus separated particles are returned from the lower portion of the separator through standpipe 52 to the fluid bed 26. Separated gases are directed from the upper portion of separator 29 through line 30 and the pressure control valve 31, preferably to suitable heat recovery equipment, such as a waste-heat boiler, steam superheater, hot gas turbine or the like, not illustrated, for the recovery of readily available heat energy.

A stream of partially regenerated solid particles is withdrawn from a suitable point in fluid bed 26 beneath its upper extremity 27 and preferably from the upper portion of the bed and is directed through conduit 32 and the adjustable orifice or flow control valve 33 into the fluid-like bed 38 of solid particles maintained in the second stage regenerator 34. Oxidizing gas, such as air, for example, is supplied to the lower portion of this regenerator through line 41 and valve 42 and is distributed substantially uniformly over the cross-sectional area of the cylindrical portion of the vessel and bed 38 by means of a perforate plate or other suitable form of distributing grid indicated at 35. The oxidizing gas admitted through line 32 serves to burn a substantial portion of the remaining combustibles in bed 38 from the solid particles supplied thereto from the first stage regenerator. It also serves to keep bed 38 in a turbulent fluid-like condition of relatively high solid particle concentration.

A light phase 39 of materially reduced solid particle concentration relative to that prevailing in bed 38 is maintained in the upper portion of regenerator 34 above the fluid-like bed. The approximate upper extremity of the bed is indicated by the broken line 40.

The rate at which the oxygen-containing regenerating gas is supplied to bed 38 is sufficiently high that only a portion of its free oxygen content is consumed in burning combustibles from the solid particles as it passes through bed 38.

This results in substantially complete oxidation of the combustibles burned from the solid particles in bed 38 so that the gases leaving this bed and entering the light phase 39 are substantially devoid of carbon monoxide and other combustibles. They also contain a substantial quantity of free oxygen and the proportion of combustibles to free oxygen in the gas mixture in light phase 39 is thus kept at a sufficiently low value that the mixture in this zone is non-flammable under the operating conditions of temperature and pressure prevailing therein. Thus afterburning is prevented in the light phase of the second stage regenerator.

Gases and the relatively small amount of solid particles entrained therein are directed from the light phase 39 in regenerator 34 into separator 37 wherein at least a substantial portion of the remaining suspended solid particles are separated from the gases. The thus separated solid particles are returned from the lower portion of separator 37 through standpipe 36 to the fluid bed 38. Separated gases are discharged from the upper portion of separator 37 through line 43 and the pressure control valve 44, preferably to suitable heat recovery equipment, not illustrated, which may advantageously be the same as that to which hot gases from the first stage regenerator 23 are supplied through line 30, as previously described.

A stream of the hot regenerated solid particles is withdrawn from a suitable point in bed 38, and preferably from a relatively low point therein, and is directed as a relatively dense downwardly moving column through standpipe 45 and the adjustable orifice or flow control valve 46 disposed adjacent the lower end of the standpipe into transfer line 8, wherein the stream of solid particles meets and is dispersed in the stream of incoming fluid reactants supplied through line 47 and is transported in this stream of fluid reactants, as previously described, into reactor 1.

Suitable aerating gas, such as steam, for example, or other substantially inert gas, is supplied through line 51 and valve 52 to standpipe 45 on the upstream side of valve 46 for the purpose of aerating the column of catalyst particles passing through this standpipe so as to prevent excessive compaction which would hinder their flow. Preferably, the rate at which aerating gas is supplied to standpipe 45 is also sufficient to strip a considerable portion of the occluded and adsorbed oxidizing gas and combustion gases from the solid particles passing through standpipe 45 and thus prevent the introduction of such gases into the reactor. Alternatively, when desired, a more efficient method and means of stripping the solid particles being returned to the reactor may be employed. For example, we specifically contemplate the use of a stripping column similar to stripper 14 connected with regenerator 34 and transfer line 8 in the same manner as stripper 14 is connected with reactor 1 and line 20. Efficient and thorough stripping of the subdivided solid material being returned from the second stage regenerator to the reactor is not considered of as great importance as efficient and thorough stripping of the subdivided solid material being supplied from the reactor to the first stage regenerator and a more conventional method of stripping the regenerated catalyst is, therefore, illustrated in the drawing. However, substantially complete removal of oxidizing gas and combustion gases from the regenerated catalyst before it is returned to the reactor will prevent any detrimental oxidation of valuable conversion products in the reaction step and will reduce the required size of and simplify the gas concentrating and recovery equipment, not illustrated, to which normally gaseous components of the conversion products from the regenerator are ordinarily supplied.

As an effective and convenient method and means of insuring that the gas mixture existing in light phase 28 of the first stage regenerator is kept non-flammable, we contemplate the use of a suitable oxygen analyzer (for example, such as described and illustrated in our copending application Serial Number 515,866, filed December 27, 1943, now U. S. Patent 2,393,839, dated January 29, 1946) for continuously determining the free oxygen concentration in the gas mixture leaving the first stage regenerator so that it may be kept at the required low value (usually of the order of 1½ mol percent, or less, of the mixture). For automatic control of the rate at which oxidizing gas is supplied to the first stage regenerator, the oxygen analyzer above mentioned may be operatively coupled, as disclosed in our aforementioned co-pending application, to a controller which functions to reduce the opening through valve 22 in the line admitting oxidizing gas to the first stage regenerator when the free oxygen content of the gas mixture leaving this regenerator approaches the danger point at which this gas mixture would be flammable. Thus, the rate at which oxidizing gas is supplied to the first stage regenerator may be controlled in response and in inverse relation to minor changes in the free oxygen content in the gas mixture existing in the light phase 28, to keep the free oxygen content so low that after-burning will not occur in this zone.

We also contemplate the use of a similar gas analyzer, which is also described and illustrated in our aforementioned co-pending application, for determining the combustible content of the gas mixture leaving the second stage regenerator so that it may be kept at a low value which prevents the mixture from becoming flammable. This analyzer may also be operatively coupled, when desired, as is also disclosed in our aforementioned co-pending application, with a control instrument which in this instance functions to increase the opening through valve 42 in the line admitting oxidizing gas to the second stage regenerator when the combustible content of the gas mixture leaving this regenerator approaches the danger point at which after-burning would occur in the light phase 39. Thus, the rate at which oxidizing gas is supplied to the second stage regenerator may be controlled in response and in direct relation to minor changes in the combustible content of the gas mixture existing in light phase 39. We have found that when this combustible content is kept below approximately 6 mol percent of the gas mixture, after-burning will not occur in light phase 39 under the operating conditions commonly employed in this zone.

We claim:

1. The method of regenerating a mass of substantially incombustible solid particles, which are susceptible to damage at high temperature, by burning combustible contaminants therefrom, which method comprises maintaining a relatively dense bed of the solid particles in each of two confined combustion zones in series, supplying an independent stream of oxidizing gas to each of said beds to effect burning of combustible contaminants from the solid particles thereof, removing resulting gaseous products of combustion, including any incompleted oxidized volatile combustibles and unconsumed free oxygen, from each of said beds and from the respective combustion zones through a light phase region within the latter in which the solid particle concentration is insufficient to effect the rapid dispersion of heat developed therein, preventing passage of the gaseous products thus removed from the second zone of the series through the bed in the first zone of the series, passing the subdivided solid particles undergoing said regeneration from the bed in the first combustion zone to the bed in the second zone, supplying the stream of oxidizing gas to the first zone at a sufficiently low rate that its free oxygen content is substantially entirely consumed within the bed, whereby to keep the free oxygen concentration of the gas mixture in said light phase of the first combustion zone so low that the mixture is non-flammable therein, and supplying the independent stream of oxidizing gas to the second zone at a sufficiently high rate that its free oxygen content is only partially consumed within the bed, whereby to keep the combustible content of the gas mixture in said light phase of the last named zone so low that the mixture is non-flammable therein.

2. A process such as defined in claim 1 wherein hot regenerated solid particles from the second combustion zone are supplied to a separate confined reaction zone, therein contacted with fluid reactants to be endothermically converted and supplying heat to the endothermic reaction conducted therein, said reaction resulting in the deposition of combustible contaminants on the solid particles, and wherein contaminated solid particles are returned from said reaction zone to the first combustion zone.

3. A process such as defined in claim 1, wherein hot regenerated solid particles from the second combustion zone are supplied to a separate confined reaction zone, therein contacted with fluid reactants to be endothermically converted and supplying heat to the endothermic reaction, said reaction resulting in the deposition of combustible contaminants on the solid particles, and wherein contaminated solid particles are returned from said reaction zone to the first combustion zone and are substantially stripped in transit between the reaction zone and first combustion zone of occluded and adsorbed volatile combustibles.

4. The method of burning combustible contaminants from a mass of substantially incombustible solid particles which are susceptible to damage at high temperature, which method comprises supplying a stream of the contaminated solid particles to a confined combustion zone, maintaining a relatively dense fluid-like bed of the solid particles in said combustion zone, passing a stream of oxidizing gas upwardly through said bed at a linear velocity which partially counteracts the force of gravity on the solid particles and causes their hindered settling within the bed and at a sufficiently low rate that substantially all of its free oxygen content is consumed in burning combustibles within said bed, whereby the free oxygen content of the resulting gas mixture leaving the bed is maintained so low that said mixture is non-flammable, maintaining a light phase region of materially reduced solid particle concentration above said bed within said confined zone and discharging the aforesaid resulting gaseous products from the bed and zone through said region, directing a stream of resulting solid particles from which a portion of the combustibles have been thus burned from a point within the aforesaid bed beneath its upper extremity into a separate confined combustion zone, therein maintaining another relatively dense fluid-like bed of the solid particles, passing a second independent stream of oxidizing gas upwardly through the last named bed at a linear velocity which partially counteracts the force of gravity on the solid particles and causes their hindered settling within the bed and at a sufficiently high rate that only a portion of its free oxygen is consumed in passing through the bed, whereby the free oxygen content of the resulting gas mixture discharged from the bed is so low in combustibles that it is non-flammable, maintaining a region of materially reduced solid particle concentration above said bed in the last named zone, discharging the aforesaid gaseous products which are low in combustibles from the last named bed and zone through the last named region and preventing passage thereof through the bed in the first-mentioned combustion zone, and withdrawing from the last named bed at a point therein beneath its upper extremity stream of resulting solid particles from which combustible contaminants have been burned.

5. The method defined in claim 4 further characterized in that the contaminated solid particles supplied to the first named combustion zone are commingled with the incoming stream of oxidizing gas employed in said zone and are supplied to said zone and to the fluid-like bed therein by the gas-lift action of said oxidizing gas, the solid particles supplied from the first named to the second named combustion zone are passed between said zones in the form of a relatively dense column and supplied by gravity from the first named bed to the upper portion of the last named bed, and wherein the stream of solid particles withdrawn from the last named bed is removed from a relatively low point in the latter, whereby the general direction of flow of the solid particles in the last named bed is countercurrent to the oxidizing gas passed therethrough.

6. A process such as defined in claim 4, wherein the stream of solid particles withdrawn from the second named combustion zone is commingled in heated state with a stream of liquid reactants to be endothermically converted, the latter being vaporized and serving to transport the solid particles by their gas-lift action, into a separate confined reaction zone, maintaining a fluid-like bed of the solid particles in said reaction zone and therein effecting the desired conversion of the liquid reactants while passing the latter upwardly through the bed at a velocity which partially counteracts the force of gravity on the solid particles and causes their hindered settling, said conversion reaction being accompanied by the deposition of said combustible contaminants on the solid particles in said reaction zone and contaminated solid particles being directed from the fluid-like bed in the reaction zone into the fluid-like bed in the first named combustion zone.

7. A process for regenerating subdivided solid catalyst particles containing combustible contaminants which comprises maintaining a first and a second relatively dense fluid-like bed of the solid particles at combustion temperature commingling contaminated catalyst particles with a stream of oxidizing gas and supplying the same upwardly into said first bed by the gas-lift action of the oxidizing gas, passing said gas through the first bed at a sufficiently low rate that substantially its entire free oxygen content is consumed in burning combustibles within the bed, removing partially regenerated catalyst particles from said first bed at a point below the upper extremity of the bed and supplying the same by gravity and in the form of a relatively dense column to the upper portion of said second bed, passing a second independent stream of oxidizing gas upwardly through the second bed at a sufficiently high rate that only a portion of its free oxygen content is consumed within the bed, preventing passage of the gaseous products from the second bed through said first bed, and removing a stream of regenerated catalyst particles from said second bed at a relatively low point thereof, whereby the general direction of flow of the solid particles in the last named bed is countercurrent to the oxidizing gas passed therethrough.

CHARLES L. THOMAS.
JOHN T. PINKSTON, JR.